No. 863,581. PATENTED AUG. 20, 1907.
J. C. BELLOFF & A. ROTH.
EMERGENCY ATTACHMENT FOR HORSESHOES.
APPLICATION FILED MAR. 29, 1907.
2 SHEETS—SHEET 1.
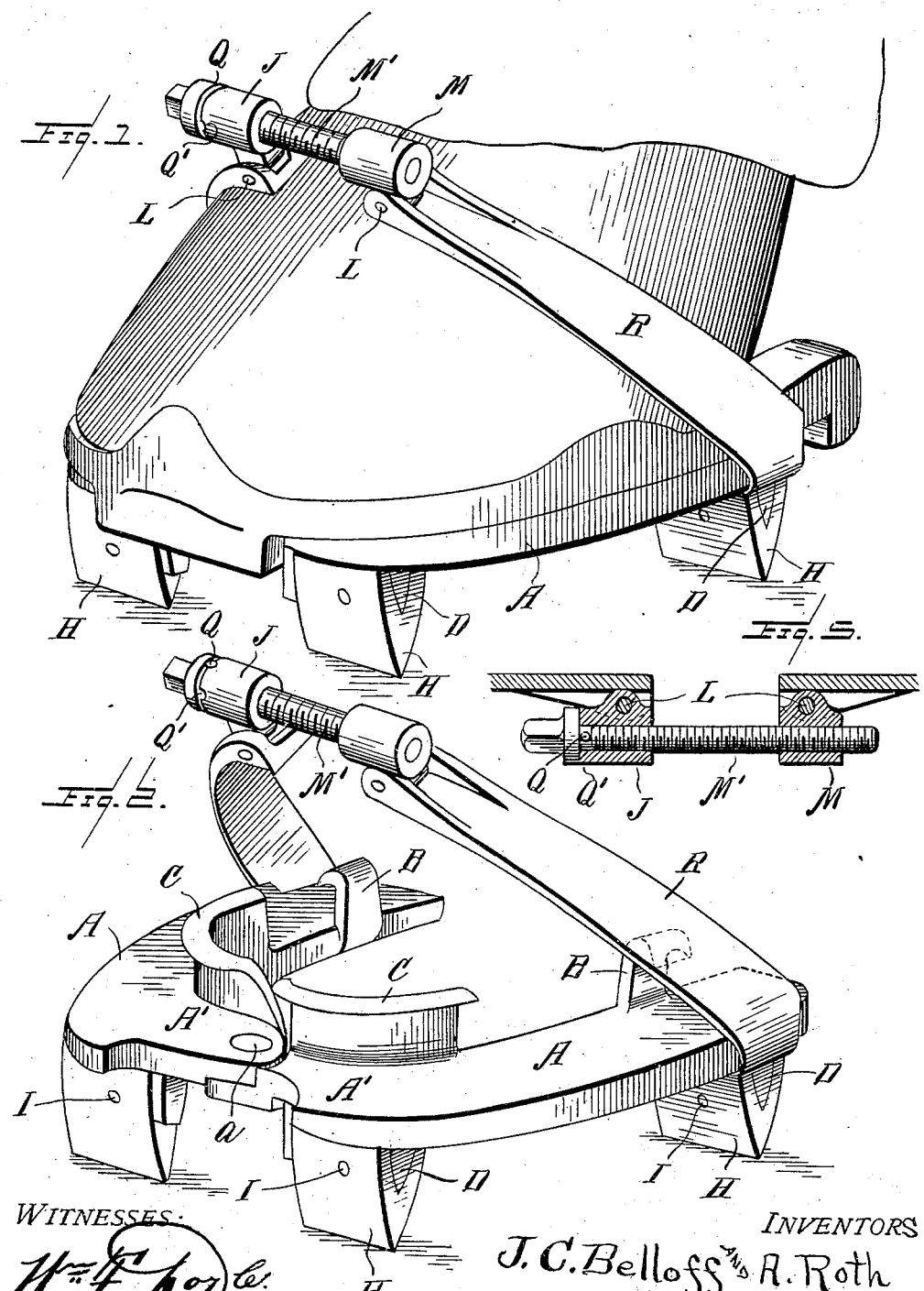
WITNESSES:
INVENTORS
J. C. Belloff and A. Roth
By Franklin W. Hough
Attorney

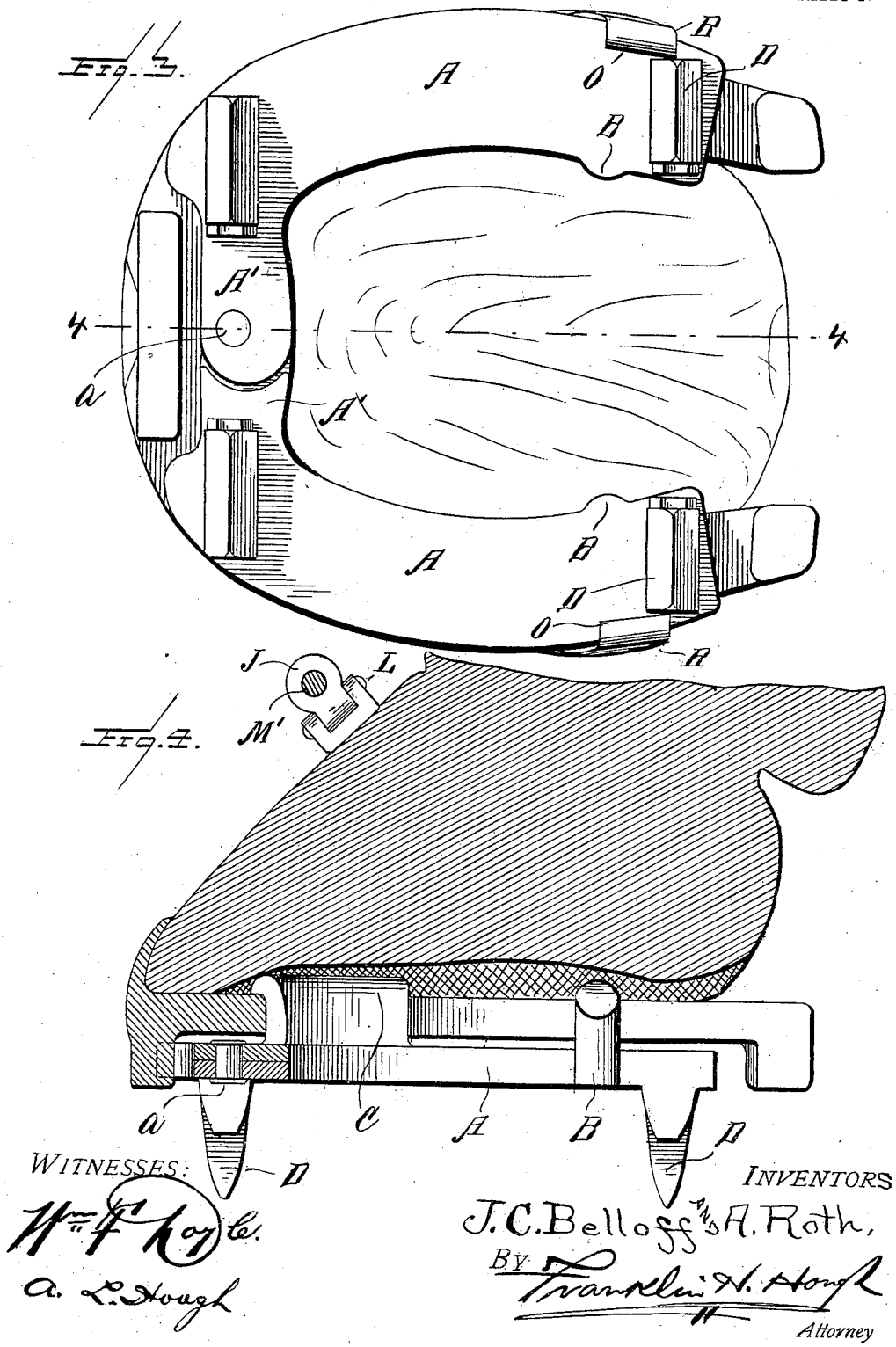

UNITED STATES PATENT OFFICE.

JOHN C. BELLOFF AND ANTON ROTH, OF NEW BRUNSWICK, NEW JERSEY.

EMERGENCY ATTACHMENT FOR HORSESHOES.

No. 863,581.      Specification of Letters Patent.      Patented Aug. 20, 1907.

Application filed March 29, 1907. Serial No. 365,404.

*To all whom it may concern:*

Be it known that we, JOHN C. BELLOFF and ANTON ROTH, citizens of the United States, residing at New Brunswick, in the county of Middlesex and State of New Jersey, have invented certain new and useful Improvements in Emergency Attachments for Horseshoes; and we do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in emergency horseshoes, the object of the invention being to produce a simple and efficient means for attachment to an ordinary shoe which is fastened to the hoof of an animal and for the purpose of preventing slipping of the shoe in the event of icy weather.

Our invention comprises various details of construction and combinations and arrangements of parts which will be hereinafter fully described and then specifically defined in the appended claims.

We illustrate our invention in the accompanying drawings, in which:—

Figure 1 is a perspective view showing the application of our invention to a horseshoe which is fastened to the hoof of an animal. Fig. 2 is a perspective view of the device removed from the shoe. Fig. 3 is a bottom plan view. Fig. 4 is a sectional view taken on line 4—4 of Fig. 3, and Fig. 5 is a detail view showing the means for holding the tightening bolt in place.

Reference now being had to the details of the drawings by letter, A, A designate two plates which conform essentially to the curvature of the shoe to which they are to be attached, and each of said plates has an inwardly projecting portion A' connected together by means of a pivot a. Rising from the upper edge of each plate are the lugs B near the heels of said plates, said lugs curving toward the outer edge of the plates. C, C designate curved flanges which are integral with said plates and extend laterally along the marginal edges of said extensions which are pivoted together and are curved, as shown, and extend toward the front edge of the plates. Projecting from the bottoms of said plates are the tapering lugs D which are apertured and are adapted to receive the V-shaped calks H which are fitted thereover and held in place by means of rivets I. By this particular construction of calks, it will be noted that they may be replaced by new ones by simply driving out the rivets and inserting new calks in their place. Each of said plates has an elongated slot O formed near the heel thereof and is adapted to receive one end of strap R, each of which is bent to form a loop passing through the slot, and the forward ends of said straps each carries a pivot pin L upon one of which is pivotally mounted a threaded member M designed to receive a screw M', the other of said pivot pins upon said strap being pivotally connected to a screw holder J which has a central unthreaded aperture to receive said screw. Projecting at points diametrically opposite from said screw are the pins Q which are designed to engage the grooves Q' formed in the end of the member J for the purpose of preventing the screw from turning when tightened.

In adjusting the device to a horseshoe upon the hoof of an animal, the two plates A are swung toward each other so that the curved lugs thereon may engage over the upper inner edge of the horseshoe, after which the plates are moved from each other, turning upon their pivots until said lugs securely engage the shoe. The straps are brought toward each other diagonally over the hoof, and the screw passing through said members J and M, is tightened, causing the ends of the strap to be securely drawn toward each other. As the straps are drawn together over the hoof, the heel portions of said plates will be drawn outward and securely held to the horseshoe. In removing the device, the screw is simply loosened and the straps separated, after which the inner ends of the heels of the plates may be moved toward each other to free the lugs from the shoe.

By the provision of an emergency attachment for horseshoes as shown and described, it will be noted that a simple and efficient means is afforded whereby sharp calks may be quickly adjusted to shoes upon animals, and especially adapted for icy weather to prevent slipping. When the removable calks become worn, they may be easily replaced. It will also be noted that our invention is made adjustable so that it may be readily fitted to shoes of various sizes.

What we claim is:—

An attachment for horseshoes to prevent slipping, consisting of plates pivotally connected together, calks upon said plates, lugs projecting from the plates and designed to engage over the upper edges of a horseshoe, straps pivotally connected to said plates, pivotal members carried by said straps, a screw carried by one of said members, the other member being threaded to receive the screw, one of said members having grooves in the end thereof, and pins projecting from the screw and adapted to engage said grooves, as set forth.

In testimony whereof we hereunto affix our signatures in the presence of two witnesses.

JOHN C. BELLOFF.
                                     ANTON ROTH.

Witnesses:
     VAN CLEEF VOORHEES,
     H. C. MEAGHER.